No. 627,454. Patented June 20, 1899.
C. S. BOOTH.
SAFETY SUCTION VALVE FOR PUMPS.
(Application filed Mar. 4, 1899.)
(No Model.)
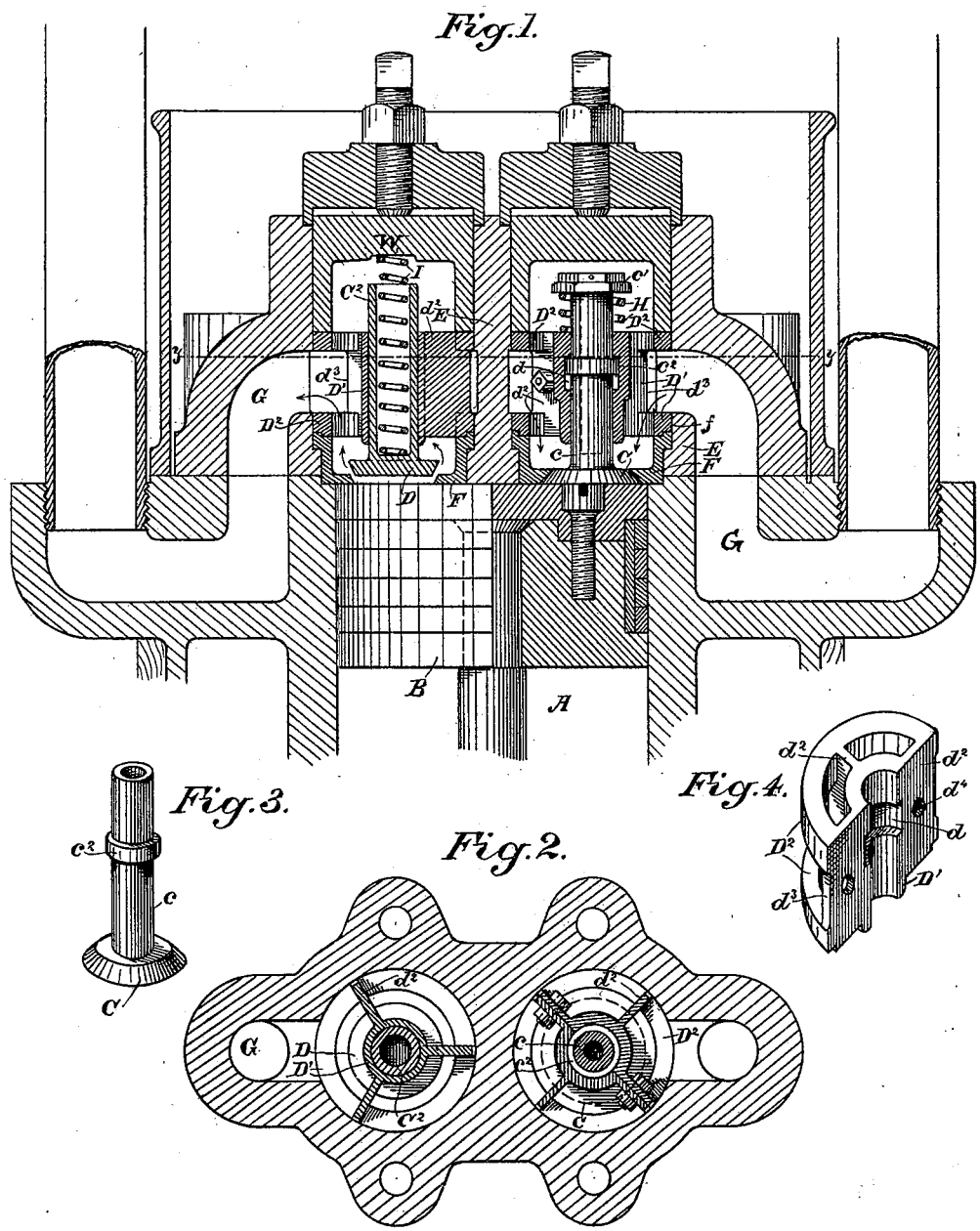

UNITED STATES PATENT OFFICE.

CHARLES SIDMON BOOTH, OF OAKLAND, CALIFORNIA, ASSIGNOR TO THE OAKLAND IRON WORKS, OF SAME PLACE.

SAFETY SUCTION-VALVE FOR PUMPS.

SPECIFICATION forming part of Letters Patent No. 627,454, dated June 20, 1899.

Application filed March 4, 1899. Serial No. 707,697. (No model.)

*To all whom it may concern:*

Be it known that I, CHARLES SIDMON BOOTH, a citizen of the United States, residing at Oakland, county of Alameda, State of California, have invented an Improvement in Safety Suction-Valves for Pumps; and I hereby declare the following to be a full, clear, and exact description of the same.

My invention relates to an improvement in pumps. It is especially designed to provide a safety device by which the inlet-valves are prevented from dropping into the pump by reason of its disconnection or breakage thereof. It consists in details of construction which will be more fully explained by reference to the accompanying drawings, in which—

Figure 1 is a vertical longitudinal section through the valves. Fig. 2 is a horizontal section on line $y\ y$ of Fig. 1. Fig. 3 is a view of the inlet-valve. Fig. 4 is a view of one-half of the cage of the inlet-valve.

In pumps which are designed to compress air, ammonia, or other gases or like fluids the medium to be compressed is usually admitted through a suction-valve which opens inwardly and is discharged through a corresponding outwardly-opening valve. These valves are ordinarily placed in the head of the cylinder and are held in place by nuts or other suitable connections. By continuous use either the nuts may be accidentally disengaged or the valve-stems may become crystallized and break or in some other way the inlet-valve be so disengaged that it will fall into the cylinder, and the next movement of the piston toward the cylinder-head will catch the valve and force it against the cylinder-head, so as to either burst it off or cause other serious damage.

The object of my invention is to prevent such accidents; and it comprises a novel construction of the cage in which the valve operates, the shank of the valve guided therein, whereby the proper movements of the valve are allowed, and a stop by which it is prevented from becoming disengaged and falling into the cylinder.

In my present illustration I have shown a vertically-disposed cylinder A, within which the piston B is caused to reciprocate. The pump or cylinder head is so constructed as to contain an inlet-valve C, which opens inwardly, and an outlet-valve D, which opens outwardly. The seat of the outlet-valve being convergent toward the cylinder, there is no danger of this valve becoming detached and falling into the cylinder. The seat of the inlet-valve diverges toward the cylinder, and it is this valve which I particularly desire to protect. This valve C has a shank $c$ extending vertically up through a cage $D'$, which is centrally bored of a diameter to allow the shank $c$ to move freely and vertically therein. The shank of the valve has around it, preferably formed as a part of the shank, a collar $c^2$, and the interior of the cage $D'$ has a corresponding chamber $d$ formed in it coincident with the position of the collar $c^2$. This chamber is made of such a length as to allow the valve to move freely through the desired distance to give it the proper rise and fall; but, as will be seen, if the nut $c'$, which screws upon the head of the valve-stem, should be accidentally disengaged or removed the collar $c^2$ will prevent the valve from falling into the cylinder, as it would be checked by the collar striking the bottom of the chamber $d$. In order to introduce a valve-stem of this description into the cage, I have shown the latter formed with radial exterior ribs $d^2$, of which I have shown in the present case four. The top and bottom of the cage are made circular, forming rims at the outer ends of the arms $d^2$, and these circular rims fit within the housing E of the valve-chambers, while the interspaces between the ribs allow of a free passage of the fluid which is being pumped whenever the valve is opened. These passages between the ribs are also connected by cutting away the edges of the ribs or concaving them, as shown at $d^3$, in the vertical portion which extends from one of the rims $D^2$ to the other, and this allows a free circulation and distribution of the fluid as it passes through the spaces around the cage from the inlet-pipe and to the outlet-pipe G. The cage is made in two halves, the vertical plane of division passing through one pair of the ribs $d^2$, of which I have shown four in the present case, standing at right angles with each other. Holes $d^4$ are made through the two contacting half-ribs which form the meeting planes of the sections of the cage, and bolts passing through them hold the two parts of the cage together after the valve has been placed. When the two halves are separated, it is only necessary to lay the shank of the valve into the central vertical opening in which it moves, with the collar $c^2$ lying in the annular enlarged chamber $d$ of the cage. Then by bolting the two halves of the cage together the valve is held in place and prevented from falling out.

The cages in which the valves are carried are fitted into the pump or cylinder head and have their lower surfaces fitted to rest upon rims surrounding the upper edges of the valve-seats, said seats resting upon shoulder in the casing, as shown. The cages are fitted upon the top of the valve-seats, as shown at $f$, and through passages and connecting-pipes, as shown at G, the fluid passes to the inlet-valve on one side and from the outlet-valve on the opposite side, the passage for fluid being perfectly free by reason of the open spaces between the ribs $d^2$ of the valves.

The inlet-valve stem is surrounded by a spiral spring H, which rests upon the top of the cage, and its upper end presses against the nut $c'$, which is screwed upon the top of the shank of the valve.

The outlet-valve has a large tubular shank $C^2$ extending upwardly through a corresponding central bore in its cage, and this shank is bored out, as shown, to receive a spring I, the lower end of which presses in the bottom of the bore and practically upon the top of the valve without any intermediate valve-stem. The upper end presses against the top of the housing at W and acts to close the valve after it has been opened by the pressure of the gas being forced through the valve-opening. The bore of the large valve-shank $C^2$ serves as a chamber for the spring, and the exterior of the shank is guided in the bore of the cage, in which it is slidable.

The whole device is simple, and the construction is such that all parts can be easily reached if repairs are necessary. The wear is reduced. There is no danger of the inlet-valve dropping into the cylinder and the parts being separated, as shown. Any part of them is easily replaced without disturbing the remainder.

Having thus described my invention, what I claim as new, and desire to secure by Letters Patent, is—

1. In a compressing-pump, inlet-valves, seats in the cylinder-head against which they are closable, cages having vertical central openings within which the shanks of the valves are movable, annular enlarged chambers formed within the length of said central bores and collars formed upon the valve-shanks intermediate of their ends and fitting and movable within said chambers.

2. In a compressing-pump, inlet-valves closable upwardly against seats in the cylinder-head and centrally-bored cages through which the valve-shanks are movable, collars formed around the shanks intermediate of their length, annular chambers formed in the length of the bore of the cage having a length equal to the longitudinal movement of the valve in opening and closing, nuts or collars fitting upon the upper ends of the valve-shanks and springs intermediate between the cages and said nuts whereby the valves are closed after each opening thereof.

3. In a compressor-pump, inlet-valves having shanks with surrounding collars intermediate of their length, cages centrally bored to guide the valve-shanks and having annular chambers corresponding with the collars of the valve-shanks, said chambers having a length to admit of the movement of the valve in opening and closing, the cages being formed in two segments whereby they may be separated for the introduction of the valves and bolts by which they are held together after the valves are in place.

In witness whereof I have hereunto set my hand.

CHARLES SIDMON BOOTH.

Witnesses:
E. B. NORTON,
J. C. BAKER.